United States Patent
Brewer

(10) Patent No.: US 7,131,473 B1
(45) Date of Patent: Nov. 7, 2006

(54) PROGRAMMABLE COPING BIT

(75) Inventor: James M. Brewer, Mocksville, NC (US)

(73) Assignee: Freud America, Inc., High Point, NC (US)

( * ) Notice: Subject to any disclaimer, the term of this patent is extended or adjusted under 35 U.S.C. 154(b) by 0 days.

(21) Appl. No.: 11/184,164

(22) Filed: Jul. 19, 2005

(51) Int. Cl.
*B27C 9/00* (2006.01)
*B27M 1/00* (2006.01)
*B27M 1/08* (2006.01)

(52) U.S. Cl. .................. 144/371; 144/91; 144/91.2; 144/135.2; 144/218; 144/231; 409/203; 409/217; 409/192; 407/31; 407/35

(58) Field of Classification Search .......... 144/135.2, 144/218, 231, 3.1, 1.1, 90.1, 91, 91.2, 134.1, 144/367, 371, 219, 228, 253.2, 253.5, 235–237, 144/253.1; 407/31, 35; 409/192, 203, 217
See application file for complete search history.

(56) References Cited

U.S. PATENT DOCUMENTS

| | | | |
|---|---|---|---|
| 510,887 A * | 12/1893 | Bowman | 144/231 |
| 1,172,776 A * | 2/1916 | Engler | 144/231 |
| 4,505,086 A * | 3/1985 | Hansen | 52/589.1 |
| 5,433,563 A * | 7/1995 | Velepec | 409/234 |
| 5,468,100 A * | 11/1995 | Naim | 409/234 |
| 5,615,718 A * | 4/1997 | Venditto | 144/135.2 |
| 5,899,252 A * | 5/1999 | Pozzo | 144/371 |
| 5,996,659 A * | 12/1999 | Burgess | 144/347 |
| 6,354,347 B1 * | 3/2002 | Brewer | 144/218 |
| 6,367,524 B1 * | 4/2002 | Brewer | 144/371 |

OTHER PUBLICATIONS

Spec Sheet, *Router Shaper Bit Profiles*, © LRH Enterprises, Inc., 9250 Independence Ave., Chatsworth, CA 91311, www.irhent.com, May 23, 2005.
Spec Sheet, *King Cutter Profiles*, LRH Enterprises, Inc., 9250 Independence Ave., Chatsworth, CA 91311:, www.Irhent.com, May 23, 2005.
Spec Sheet, *Router Shaper Bits*, © LRH Enterprises, Inc., 9250 Independence Ave., Chatsworth, CA 91311 www.Irhent.com; May 27, 2005.
Spec Sheet, INFINITY Cutting Tools, *Rail & Stile for Entry & Passage Doors*, www.infinitytools.com, May 23, 2005.
Spec Sheet, Woodline Arizona Bits and Cutters, Catalog page.
Spec Sheet, MLCS Router Bits and Professional Woodworking Products, *Rails and Stiles for Entry Doors*, Copyright 2003 MLCS, LTD, www.mlcswoodworking.com, May 23, 2005.
Spec Sheet, JESADA, *691-522—New R/Stile For Doors*, www.jseek.com, May 23, 2005.

\* cited by examiner

*Primary Examiner*—Bena Miller
(74) *Attorney, Agent, or Firm*—Kennedy Covington Lobdell & Hickman, LLP

(57) ABSTRACT

A coping bit capable of being easily modified to cut profiles having tenons of varying lengths is provided. The coping bit includes an axially extending primary drive shaft and a first cutting member fixed on the primary drive shaft. An axially extending secondary drive shaft having an upper and a lower portion is removably mounted on the primary drive shaft for rotation therewith, and a second cutting member is mounted on the secondary drive shaft in spaced relation to the first cutting member when the secondary drive shaft is mounted to the primary drive shaft.

17 Claims, 8 Drawing Sheets

PROGRAMMABLE COPING BIT

FIELD OF THE INVENTION

The present invention relates to a coping bit for cutting profiles in a workpiece, and more specifically to a coping bit capable of being easily modified to cut profiles having tenons of varying lengths.

BACKGROUND OF THE INVENTION

In operations in which two workpieces are joined together, a well known method of joining the two workpieces is to form mating profiles in each of the workpieces, i.e., a tenon and a recess, which are sized to fit together as a mating pair. This joining technique is often used in the manufacture and assembly of workpieces such as doors, in general, and panel doors, in particular, such as those used in cabinetry and decorative doors. In door making, it is preferred to form tenons in the support rails of the door in an extended length. Such extended length tenons provide increased support for the support joints of the door, therefore creating a more sturdy door. A door assembled using support rails that have conventional length tenons tends to sag and is considered to be less sturdy and of inferior quality.

As is well known in the art, when it is desired to cut a profile with a recess or a corresponding tenon into the edge of a workpiece, a pair of rotating bits, such as a molding bit and a coping bit, are provided, each of which typically include two cutter elements fixed onto a drive shaft. A profile has an aesthetically pleasing shaped surface and functional aspects such as a tenon or a recess and is formed into the end of a workpiece. The edge of the workpiece to be formed is moved laterally into contact with the rotating bits. If a recess is to be formed into the workpiece, typically a molding bit that includes two cutter members having a thickness corresponding to the desired thickness of the recess, is used. Similarly, if a tenon is to be formed into the workpiece, typically a coping bit that includes two cutter members fixed thereon at a spacing corresponding to the thickness of the tenon to be formed is used so that the edge of the workpiece is cut away by the cutter elements above and below the portion that becomes the tenon.

With molding and coping bits, it is possible to form recesses and tenons, respectively, of varying thicknesses. Spacer members of varying sizes may be removably mounted between the cutting members to create the desired thickness.

However, with the above-described pair of rotating bits, it is not possible to form tenons of an extended length because the centrally located drive shaft of the coping bit is an obstruction that limits the distance that the edge of a workpiece may extend across the surface of the cutters. Thus, a tenon formed using a coping bit with two cutters is limited in length.

It is also known to use a coping bit having a single cutter member mounted onto a drive shaft to form a tenon or a recess in a workpiece, respectively. When a rotating bit of this type is used, two separate cutting operations must be used to form the profile having a tenon in the workpiece because the rotating bit only has a single cutter member. A single cutter coping bit may be used when forming an extended tenon because there is no central bearing or other obstruction on the cutter member thereby leaving a flat unobstructed planar surface for the edge of the workpiece to extend across while one side of the tenon is being cut. It is possible to form profiles of varying thickness using a single cutter rotating bit because each side of the profile is formed in a separate cutting operation.

However, when using a coping bit having a single cutter, which requires two separate cutting operations to form a tenon, often alignment problems arise, especially when tenons are cut into many workpieces. For example, when assembling a door, tenons are cut along rails that form the top, bottom and intermediate frames of the door. With a coping bit having a single cutter, a single cut is made along the end of the workpiece to cut one face of the tenon needed and then a second cut is made along the other side of the workpiece to cut the other face of the same tenon needed on the end of the workpiece. If at any time during either one of these cutting operations, the workpiece moves slightly or the craftsman applies a slightly different pressure to the workpiece being cut, the tenon will not be evenly cut and alignment problems, i.e., problems with the tenons and recesses of the workpieces fitting together, will arise when trying to assemble the workpieces of the panel door. In addition, any variations in thickness of the workpiece being cut introduce a problem when using a coping bit having a single cutter because the sides of the workpiece are used as a reference when cutting with a coping bit of this type. As such, any variation in workpiece thickness will cause the craftsman to cut the tenon unevenly and will create an alignment problem when trying to fit the cut tenon into a matching recess. The risk of creating alignment problems is present for every workpiece cut with a coping bit have a single cutter.

Further, it is often the situation that a person using a pair of rotating bits will want to form recesses, conventional length tenons and extended length tenons all in the same project. For example, when making a door, it is usually necessary to form recesses, conventional length tenons and extended length tenons to assemble a sturdy, secure door. However, as described hereinabove, the pair of rotating bits with two cutters is unable to form extended tenons into a workpiece and the pair of rotating bits with a single cutter is difficult to use without experiencing alignment problems when attempting to assemble the finished product, as described in greater detail above.

SUMMARY OF THE INVENTION

Briefly summarized, the coping bit of the present invention provides a tool capable of forming profiles having tenons of varying lengths. The coping bit includes an axially extending primary drive shaft, a first cutting member fixed on the primary drive shaft, an axially extending secondary drive shaft having an upper and a lower portion, with the lower portion removably mounted on the primary drive shaft for rotation therewith and with the upper portion extending axially away from the first cutting member on the primary drive shaft and a second cutting member mounted on the secondary drive shaft in spaced relation to the first cutting member when the secondary drive shaft is mounted to the primary drive shaft.

More particularly, the first cutting member preferably has a flat planar surface perpendicular to the axis of the primary drive shaft, and the entire central area of such planar surface is free from obstruction when the secondary drive shaft is removed from the primary drive shaft. In a preferred embodiment, a plurality of cutting blades are disposed at the periphery of and are raised above the planar surface.

In another preferred embodiment, the coping bit includes spacer elements that are removably mounted on the secondary drive shaft, a bearing member that is removably mounted on the secondary drive shaft between the first and second cutting members and a cap member that is removably mounted on the secondary drive shaft for maintaining the spacer elements and the bearing member in place on the secondary drive shaft. It is preferred that the spacer elements, bearing member and cap member be mounted on the secondary drive shaft in a predetermined spaced relation with one another as an integrated subunit that can be removed from and mounted on the primary drive shaft without affecting the predetermined spacing between the spacer elements, the bearing member and the cap member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

Figure 1:
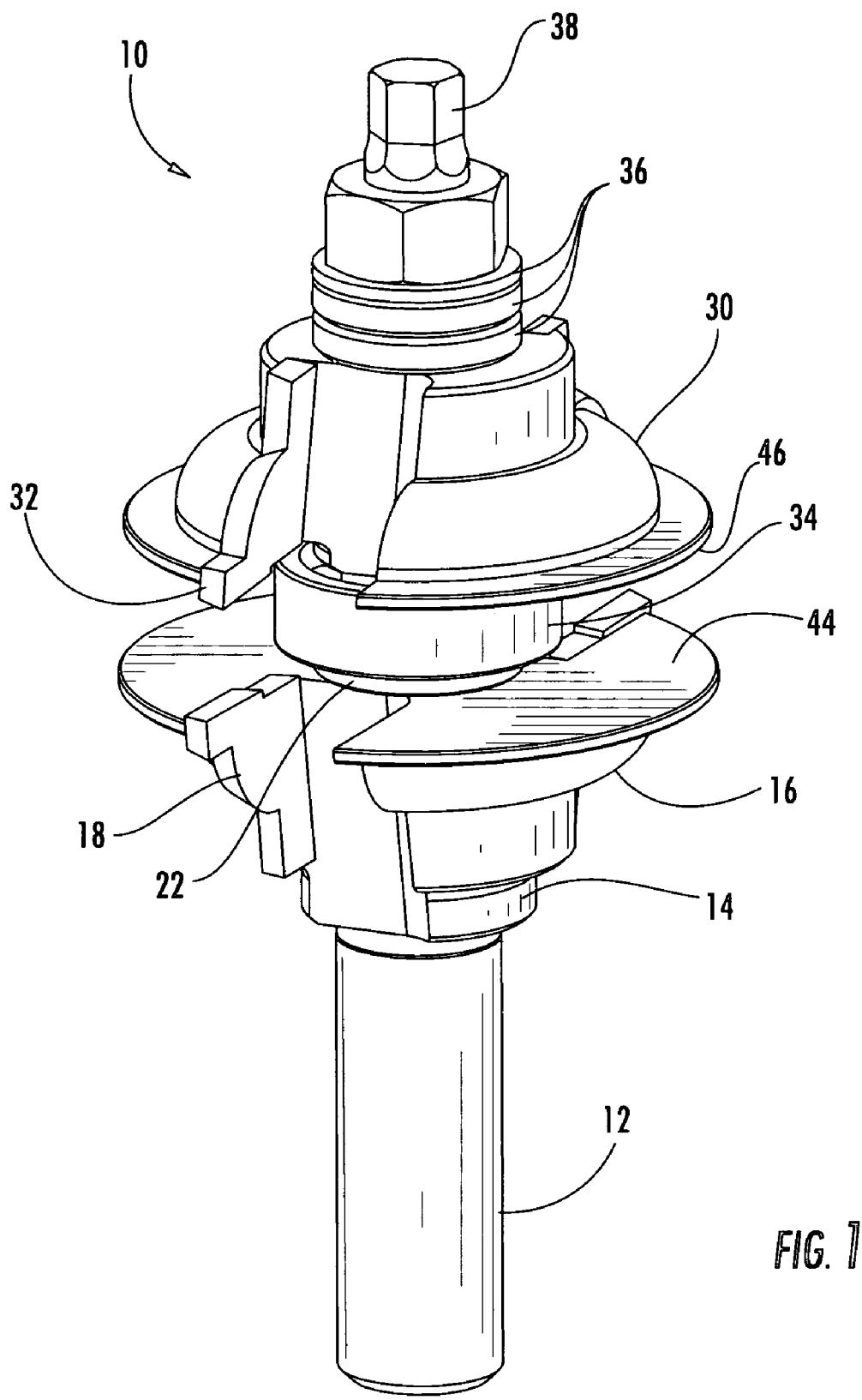
FIG. 1 is a perspective view of one embodiment of the present invention illustrating a programmable coping bit designed to form a profile in a workpiece.

The following description of the preferred embodiment is merely exemplary in nature and is in no way intended to limit the invention, its application, or uses. Referring now to the drawings, in which like numerals represent like components throughout the several views, the preferred embodiment of the present invention is next described.

Figure 2:
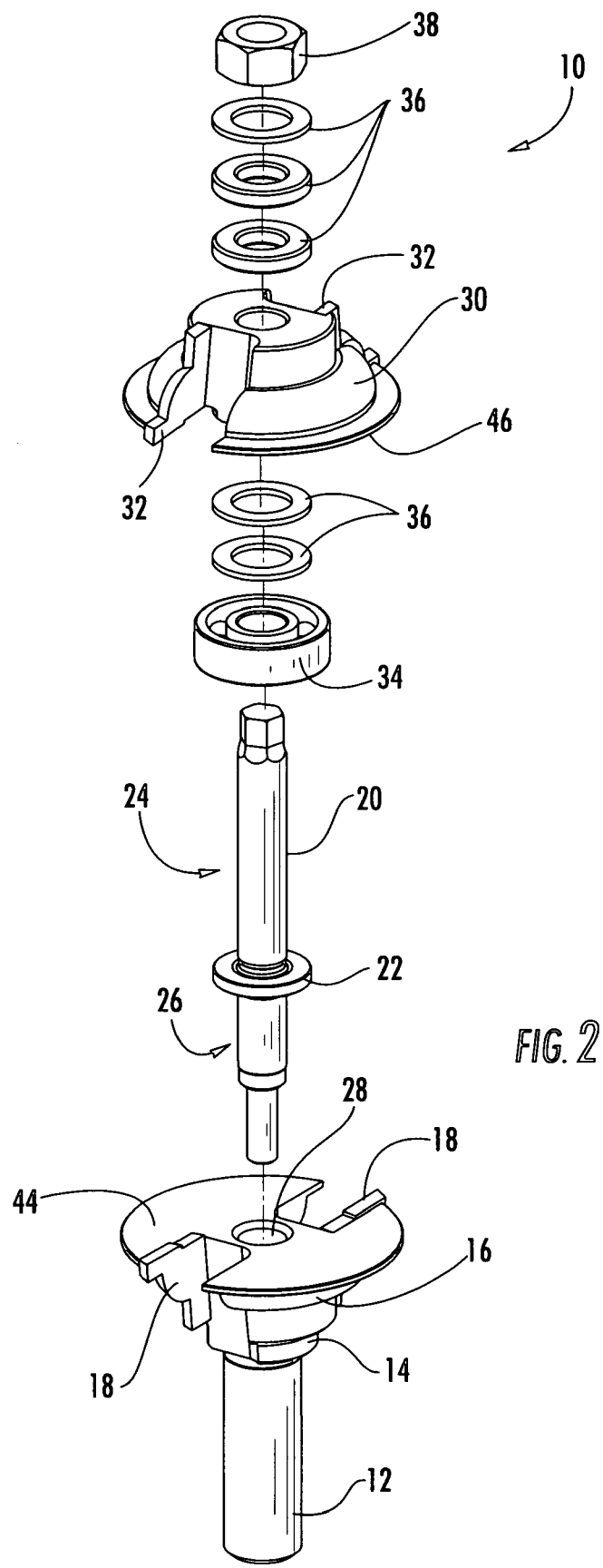
FIG. 2 is an exploded perspective view of the programmable coping bit of FIG. 1.

FIGS. 1 and 2 illustrate a programmable coping bit 10 according to one embodiment of the present invention. The coping bit 10 includes a generally cylindrical primary drive shaft 12, which is integrally formed with a shoulder 14 and first cutting member 16 at the upper end of the primary drive shaft 12. The first cutting member 16 includes an integral cutting blade 18 located at the periphery of the first cutting member 16. The first cutting member 16 has a flat planar surface 44 perpendicular to the axis of the primary drive shaft 12.

The coping bit 10 also includes a generally cylindrical secondary drive shaft 20 formed with a shoulder 22 disposed centrally along its axis. The secondary drive shaft 20 includes an upper portion 24, disposed above the shoulder 22, and a lower portion 26, disposed below the shoulder 22. The lower portion 26 of the secondary drive shaft 20 is removably mounted to the primary drive shaft 12 for rotation therewith through a central cylindrical bore 28. In the present embodiment, a small section at the bottom of the lower portion 26 of the secondary drive shaft 20 is threaded for mounting to a threaded portion in the bore 28 of the primary drive shaft 12. However, one of ordinary skill in the art will understand that the connection between the lower portion 26 of the secondary drive shaft 20 and bore 28 of the primary drive shaft 12 may be any conventional form of connection that securely holds the secondary drive shaft 20 in place but also allows for the secondary drive shaft 20 to be easily removed when desired.

The upper portion 24 of the secondary drive shaft 20 extends upwardly through a second cutting member 30 that has a cutting blade 32 fixed to the second cutting member 30 in a conventional manner and also has a flat planar surface 46 similar to that of the first cutting member 16. A ball bearing member 34 is mounted on the secondary drive shaft 20 intermediate the first and second cutting members 16, 30 for rotation relative to the secondary drive shaft 20. A plurality of spacer elements in the form of shims 36 are disposed between the ball bearing member 34 and the second cutting member 30, and a cap member 38, which is preferably a threaded nut, is threaded onto the top end of the secondary drive shaft 20 with additional shims 36 and fixed in place thereon to securely hold in place the second cutting member 30, the ball bearing member 34 and the shims 36. The secondary drive shaft 20 and the components removably mounted thereon form an integrated subunit 21 (best seen in FIG. 4), which may be easily removed by unscrewing the threaded lower portion 26 of the secondary drive shaft 20 from the primary drive shaft 12 of the coping bit 10. While the cap member 38, as illustrated, is a threaded nut, one of ordinary skill will understand that the cap member 38 may be any conventional member for mounting elements on a drive shaft.

Figure 3:
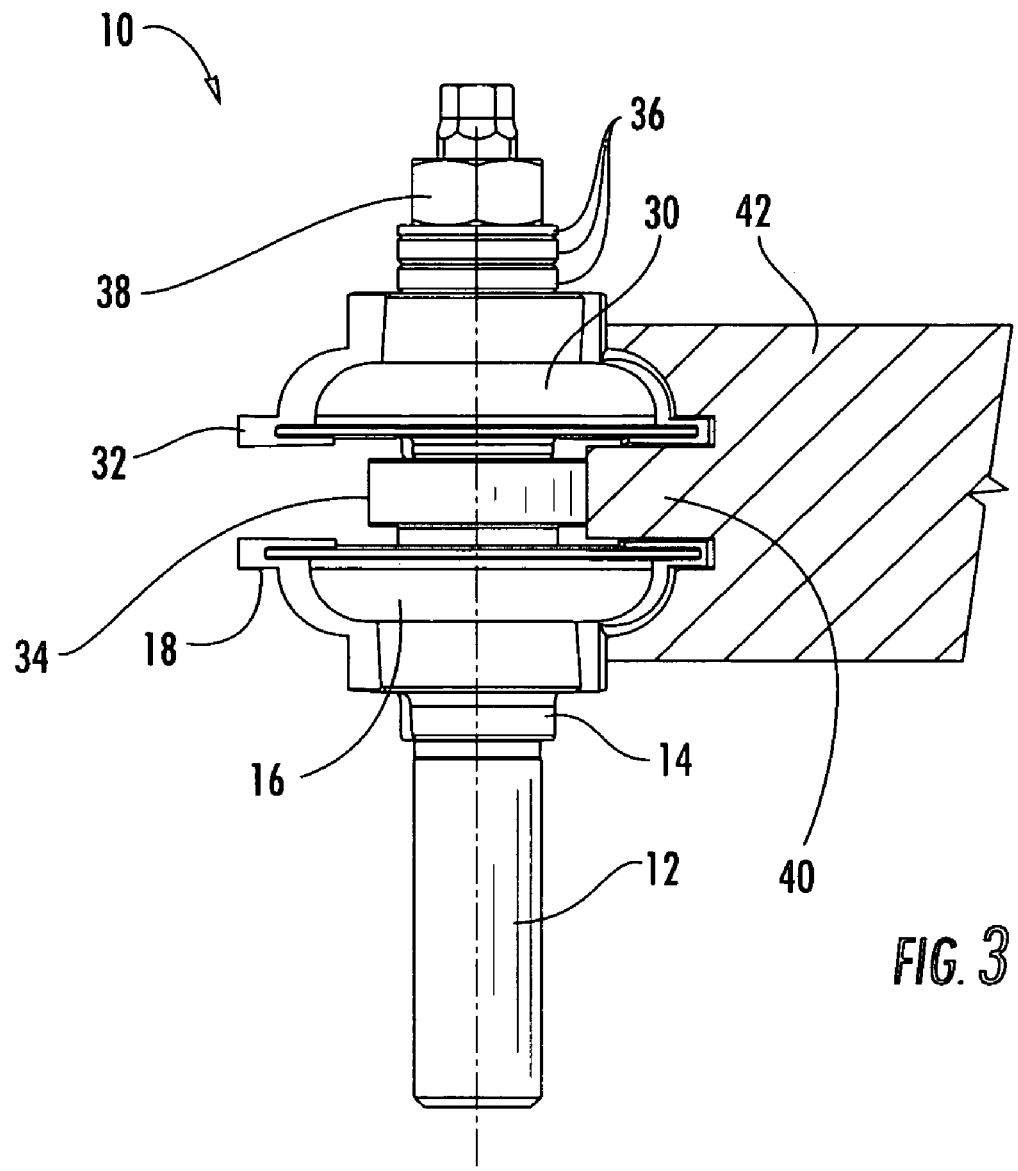
FIG. 3 is a side cross-sectional view of the programmable coping bit of FIG. 1 illustrating a profile being cut into a workpiece.

FIG. 3 illustrates the coping bit 10 in a cutting operation that forms a desired profile that has a tenon with a relatively short length. As can be seen in FIG. 3, the ball bearing member 34 and the size and location of the blades 18, 32 on the cutting members 16, 30 determine the length of the tenon 40 by the ball bearing member 34 acting as a barrier to the edge of the workpiece 42 as it is being cut by the first and second cutting members 16, 30. The axial spacing between the first and second cutting members 16, 30 determines the axial thickness of the tenon 40 being cut. Accordingly, with the first cutting member 16 and the second cutting member 30 both held in place as described above, the coping bit 10 can be used to cut a tenon 40 in a workpiece 42, with the tenon 40 having a particular desired thickness or depth, depending on the axial distance between the cutting members 16, 30 and the size and location of the blades 18, 32 on the first and second cutting members 16, 30. In a cutting operation to form a profile, the end face of a workpiece 42, e.g., rail or style of a panel door, is fed into a coping bit 10 to form the curved surface or profile until the end of the tenon 40 being cut comes into abutment with the rotatable bearing member 34. The extending end face of the tenon 40 abuts the outer periphery of the ball bearing member 34 so that the ball bearing member 34 establishes a consistent extending dimension for the tenon 40 after it is cut. Since the ball bearing member 34 is rotatably mounted on the secondary drive shaft 20, there is little or no frictional resistance between the end face of the tenon 40 and the exterior surface of the ball bearing member 34. Thus, utilizing the coping bit 10 as illustrated in FIGS. 1–3, the workpiece 42 is formed with a tenon 40, as illustrated in FIG. 3, that has a precise thickness, and a precise length. For some operations, it may be desirable to increase the thickness of the tenon 40. In such instances, if the cap member 38 is removed from the upper end of the secondary drive shaft 20, the shims 36, the second cutting member 30 and the ball bearing member 34 may be easily removed from the secondary drive shaft 20 by sliding them upwardly. Depending on the desired thickness of the tenon 40 to be cut, all of these components can then be rearranged in a variety of different configurations to provide the desired thickness for the tenon 40.

Figure 4:
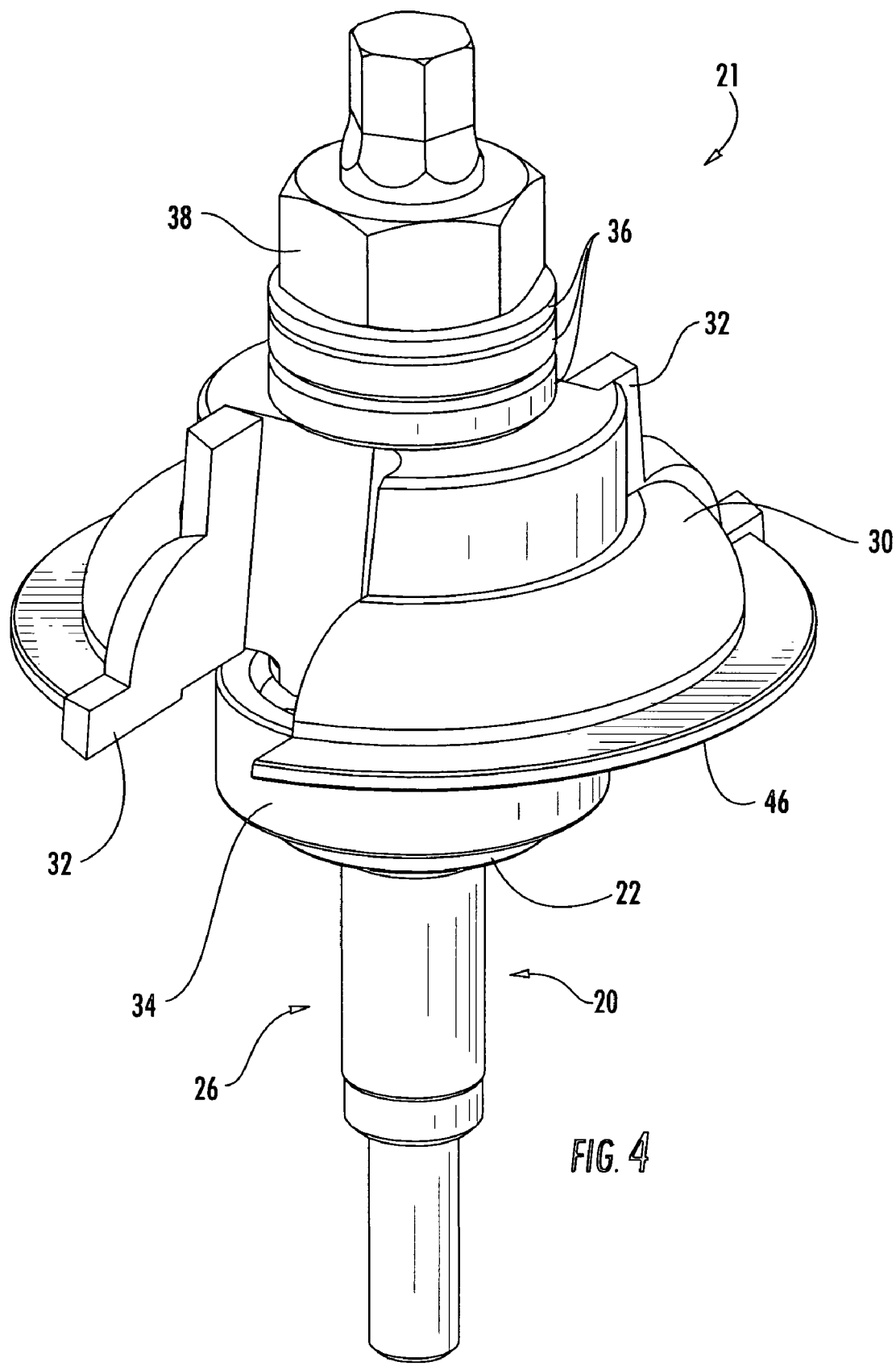
FIG. 4 is a perspective view of the upper portion of a secondary drive shaft after it has been removed from a primary drive shaft.

FIG. 4 illustrates the integrated subunit 21 after it has been removed from the primary drive shaft 12. To remove the subunit 21, the threaded lower portion 26 of the secondary drive shaft 20 is loosened from the threaded central bore 28 of the primary drive shaft 12 and the entire secondary drive shaft 20, including the cap member 38, shims 36, ball bearing member 34 and second cutting member 30 mounted thereon are separated and removed from the primary drive shaft 12. Because the cap member 38, shims 36, ball bearing member 34 and second cutting member 30 are all securely mounted on the secondary drive shaft 20 as an integrated subunit 21, the spacing and placement of these components remain in the same precise relationship to one another when the subunit 21 is removed from the primary drive shaft 12. Advantageously, this allows the subunit 21 to be programmed for a particular operation with predetermined spacing and placement of the components relative to the secondary drive shaft 20 because the spacing and placement of these components remains in tact even when the subunit 21 is removed from the primary drive shaft 12. As such, the subunit 21 may be removed and then reassembled with the primary drive shaft 12 with the same programmed spacing and placement, thus allowing the coping bit 10 to be used again without any readjustment.

Figure 5A:
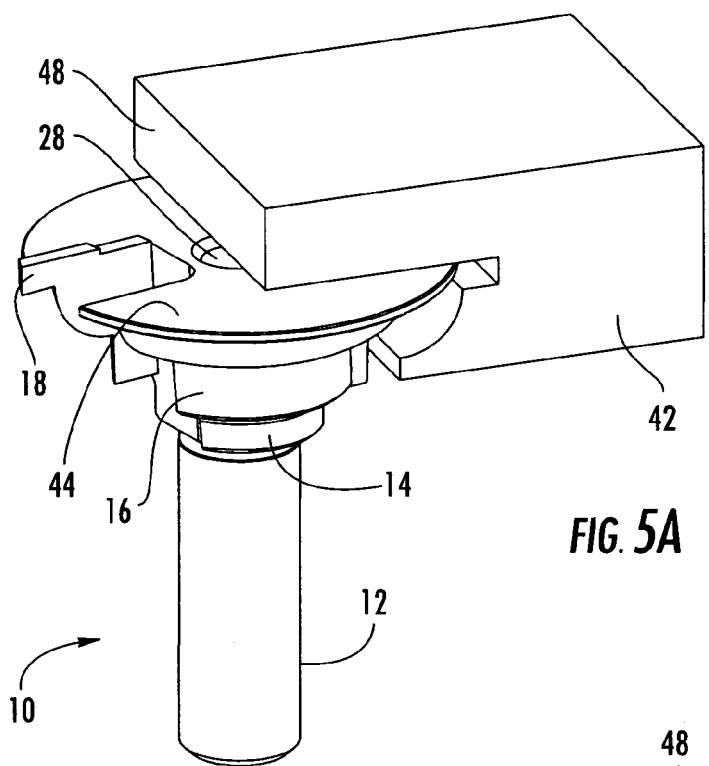
FIG. 5A is a side cross-section view of the programmable coping bit of FIG. 1 with the secondary drive shaft removed illustrating a profile that includes an extended tenon being cut into a workpiece.
Figure 5B:
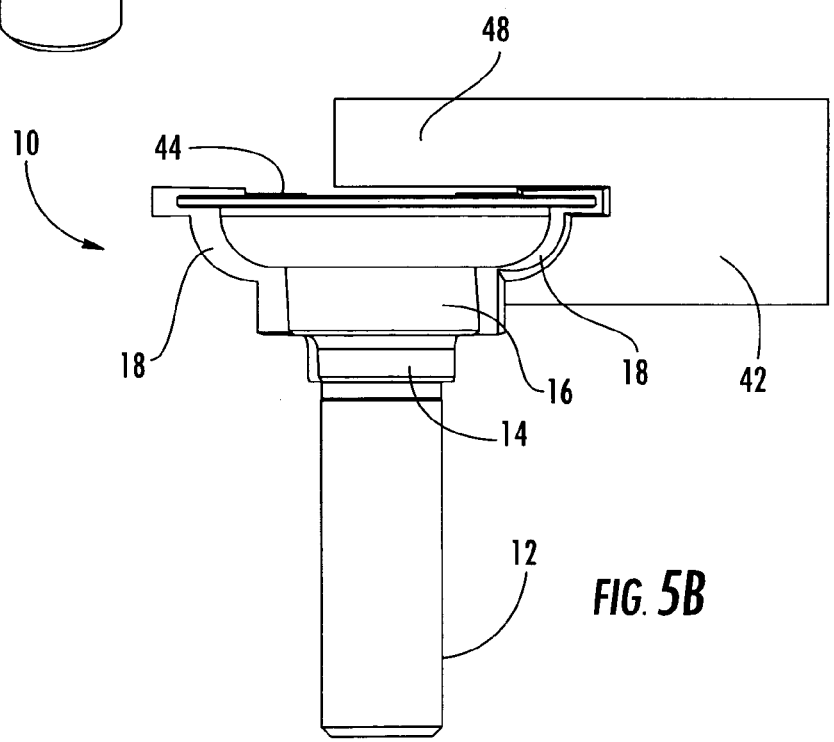
FIG. 5B is another side cross-section view of the programmable coping bit of FIG. 1 with the secondary drive shaft removed illustrating a profile that includes an extended tenon being cut into a workpiece.

FIGS. 5A and B illustrate the coping bit 10 of the present invention in a cutting operation, wherein it has been modified by removing the subunit 21 from the primary drive shaft 12. As is shown in FIGS. 5A and B, when the secondary drive shaft 20 is removed, the entire central portion of the flat planar surface 44 of the first cutting member 16 is left unobstructed. Because the surface 44 of the first cutting member 16 is unobstructed except for the cutting blades 18 at the outer periphery of the planar surface 44, the edge of the workpiece 42 being formed may extend beyond the central axis of the primary drive shaft 12 where the secondary drive shaft 20 was previously located. This modification enables the coping bit 10 of the present invention to cut a profile having a tenon 48 in a workpiece 42 that has an extended length that is much greater than the length of the tenon 40 formed with a conventional two cutting member coping bit, described above.

Figure 6:
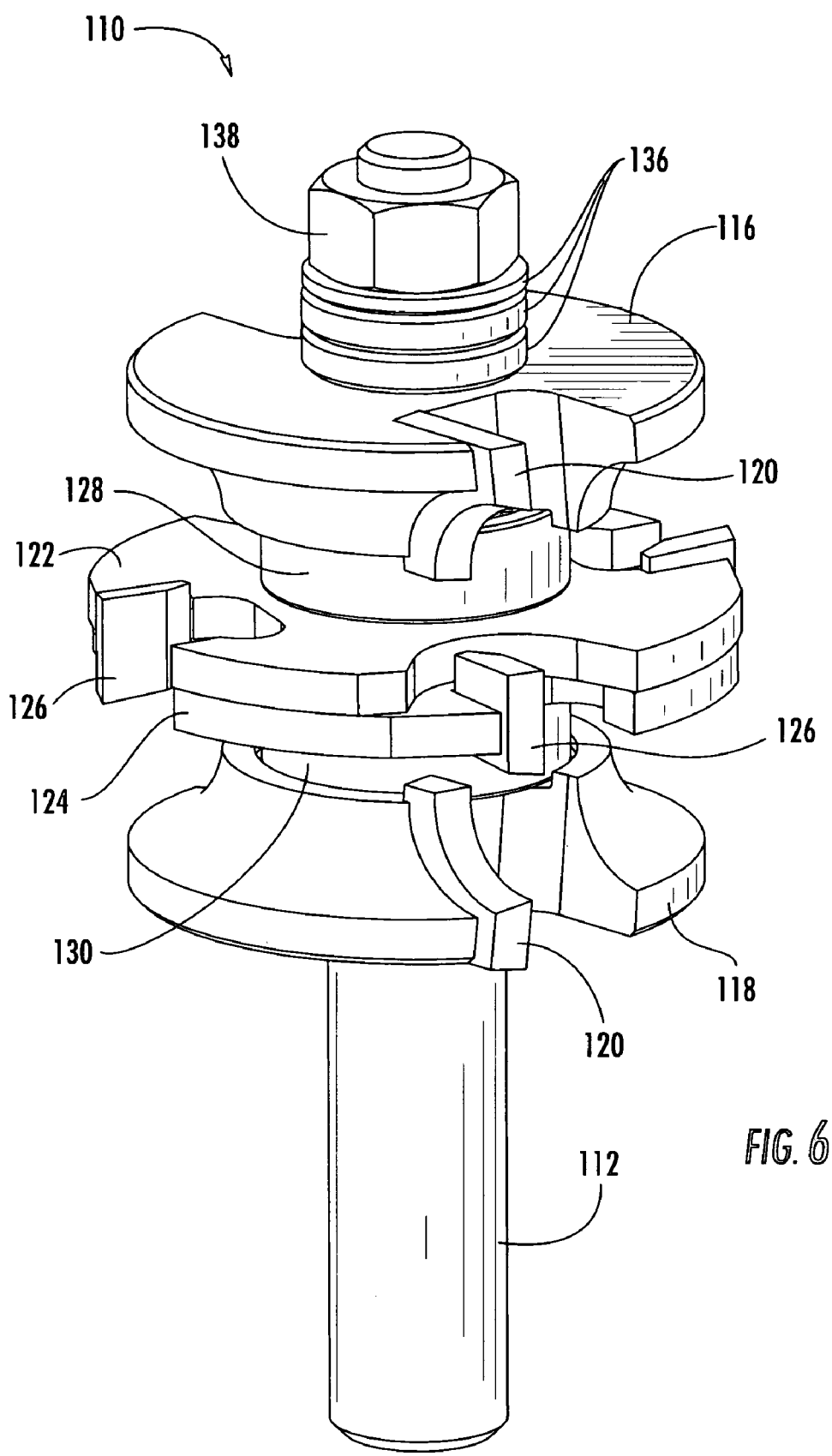
FIG. 6 is a perspective view of a molding bit designed to form a profile in a workpiece.
Figure 7:
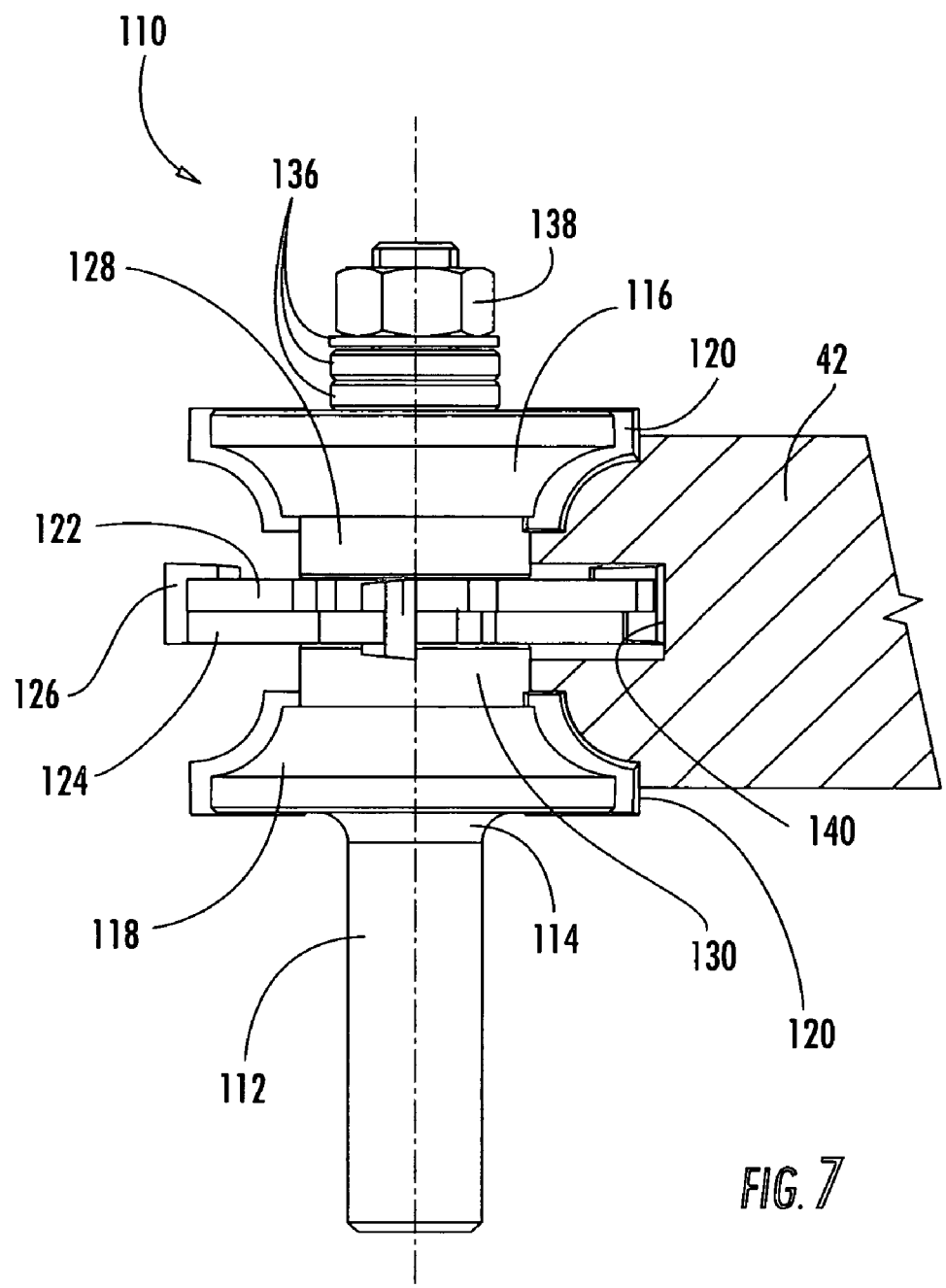
FIG. 7 is a side cross-sectional view of the molding bit of FIG. 3 illustrating a profile that includes a recess being but into a workpiece.

FIGS. 6 and 7 illustrate a conventional molding bit 110, which may be used to form a recess 140 in a workpiece 42. The molding bit 110 includes a generally cylindrical drive shaft 112, which is integrally formed with a shoulder 114 and with an outer cutting member 118 that is positioned above the shoulder 114. The upper end of the drive shaft 112 extends through another outer cutting member 116, that forms a pair with outer cutting member 118. The outer cutting members 116, 118 have cutting blades 120 integrally fixed at their outer periphery in a conventional manner. These cutting members are referred to herein as the first outer cutting member 116 and the second outer cutting member 118. Disposed intermediate the outer cutting members 116, 118 and also supported on the drive shaft 112 are a pair of central cutting members 122, 124 that have cutting blades 126 fixed at their outer periphery in a conventional manner. The pair of central cutting members 122, 124 are referred to herein as the first central cutting member 122 and the second central cutting member 124. Spacer members in the form of a pair of ball bearing members 128, 130 are mounted on the drive shaft 112, with the upper ball bearing member 128 being disposed intermediate the first central cutting member 122 and first outer cutting member 116 and the lower ball bearing member 130 being disposed intermediate the second central cutting member 124 and the second outer cutting member 118 for rotation relative to the drive shaft 112. A plurality of spacer elements in the form of shims 136 are disposed above the first outer cutting member 116, and a cap member 138, which is preferably a threaded nut, is threaded onto the top end of the drive shaft and fixed in place thereon to securely hold in place the outer cutting members 116, 118, the central cutting members 122, 124, the ball bearing members 128, 130 and the shims 136.

As described hereinabove, the central cutting members 122, 124 have cutter blades 126 mounted at the peripheries thereof. However, in this arrangement, when the central cutting members 122, 124 are disposed in direct contact with one another as best seen in FIG. 6, the cutting blades 126 overlap one another in the axial direction, and they are radially offset from one another as well. Accordingly, in this configuration, the molding bit 110 can be used to cut a recess 140 in the workpiece 42 that has a thickness or depth that is less than the overlapping combined axial thicknesses of the cutting blades 126. The recess 140 cut with this configuration is illustrated in FIG. 7.

When it is desired to change the thickness of the recess 140 to be cut by the molding bit 110, the nut 138 may be removed along with the ball bearing members 128, 130 and the shims 136, and these components may then be placed on the drive shaft 112 in a new arrangement in which a desired number of the shims 136 are disposed between the central cutting members 122, 124. Even though the central cutting members 122, 124 are now spaced from one another by the collective axial thicknesses of the shims 136 located therebetween, the cutter blades 120 are still partially overlapped or immediately adjacent one another in the axial direction so that the enlarged recess 140 can be readily cut by the molding bit 110.

Figure 8:
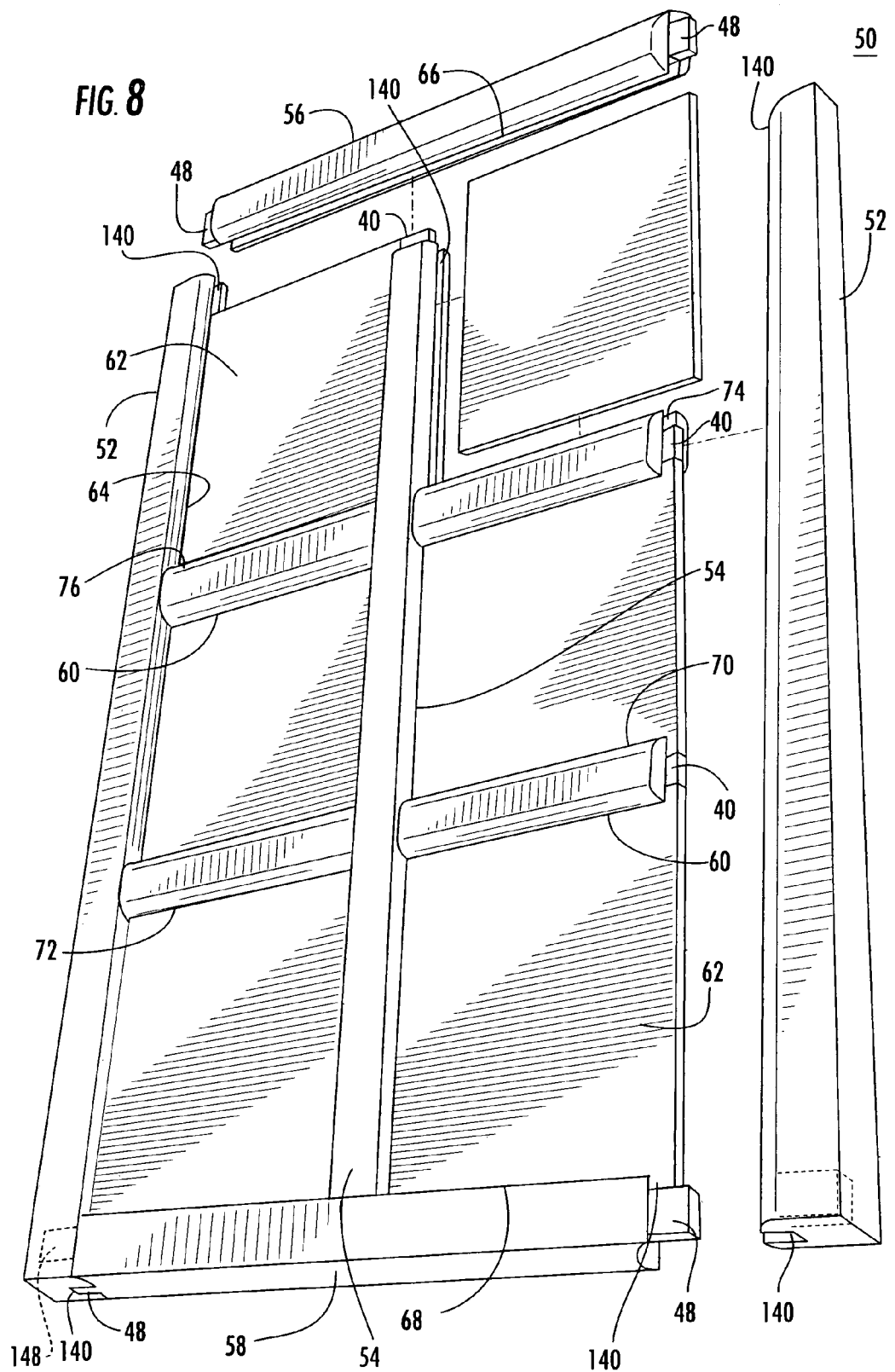
FIG. 8 is a partially exploded view of a six-panel door illustrating the profiles cut into the rails and styles of the door using the programmable coping bit of the present invention and a conventional molding bit in order for the door to be assembled.

The pair of rotating bits, i.e., the coping bit 10 of the present invention and the conventional molding bit 110, may be utilized to form recesses 140 of varying thicknesses and tenons 40, 48 of varying thicknesses and depths. For example, the coping bit 10 and molding bit 110 may be used to prepare all of the workpieces 42 needed to assemble a panel door 50. FIG. 8 illustrates the tenons 40, 48 and recesses 140 that are formed in workpieces 42 in order to assemble a panel door 50. The workpieces 42 for a panel door include styles 52, 54, support rails 56, 58, intermediate rails 60 and panels 62. As is illustrated in FIG. 8, recesses 140 are cut along the inside edges 64 of the outside styles 52, both edges of the intermediate style 54, the bottom edge 66 of the first support rail 56, the top edge 68 of the second support rail 58 and the top 70 and bottom 72 edges of the intermediate rails 60. For an interior door, typically the thicknesses of the door 50 will be 1 and ⅜ inches. For an exterior door, typically the thicknesses of the door 50 will be 1 and ¾ inches. The molding bit 110 described herein is capable of cutting all of the recesses 140 required for a typical panel door 50. For the portions of the outside styles 52 where an extended tenon 48 will be mated with a recess 140, i.e., the upper and lower portion of the outside styles 52 where the first and second support rails 56, 58 are joined to the styles 52, a separate tool such as a chisel, router bit, mortising machine, drill press equipped with a mortising bit, or some combination of all of these is used to cut a deeper pocket 148 within which the extended tenon 48 will fit. The pockets 148 that are cut into the ends of the outside styles 52 are only cut large enough to accommodate the size of the extended tenons 48 that have been formed in the first and second support rails 56, 58 so that the extended tenons 48 may fit securely within the pockets.

Also as illustrated in FIG. 8, tenons 40, 48 are formed on the right and left ends 74, 76 of the intermediate rails 60, the top and bottom ends of the intermediate style 54 and the right and left ends of the first support rail 56 and second support rail 58. Tenons 40 formed in the intermediate rails 60 and the intermediate style 54 may be of a relatively short length. However, it is preferred to form tenons 48 in the support rails 56, 58 of a relatively extended length. If such tenons 48 are not of an extended length, the completed door 50 tends to sag and is considered to be less sturdy and of inferior quality. The coping bit 10 of the present invention may be used to form both the shorter length tenons 40 and extended length tenons 48.

With reference to FIG. 8, once profiles have been cut into the workpieces 42 of the door, the door may be assembled. Three of the panels 62 and the left tenons 40 of two of the intermediate rails may be inserted into the recess 140 of the left outside style 52, and the left side extended tenons 48 of the first and second support rails 56, 58 may be inserted into the pockets 148 cut into the left outside style 52. Next, the tenons 40 of the intermediate style 54 may be inserted into the recesses 140 of the first and second support rails 56, 58 while the right tenons 40 of the intermediate rails 60 are inserted into the left side recess 140 of the intermediate style 54. Next, the remaining panels 62 and the left tenons 40 of the remaining intermediate rails 60 may be inserted into the right side recess 140 of the intermediate style 54. Lastly, the remaining panels 62 and the right tenons 40 of the remaining intermediate rails 60 may be inserted into the recess 140 of right outside style 52, and the right extended tenons 48 of the first and second support rails 56, 58 may be inserted into the pockets 148 of the right outside style 52.

To form profiles having shorter length tenons 40, the coping bit 10 of the present invention is used with the integrated subunit 21 mounted to the primary drive shaft 12 as illustrated in FIG. 4. To form a profile having extended tenons 48, the subunit 21 is removed from the primary drive shaft 12. Advantageously, because of the programmable nature of the coping bit 10, the subunit 21 may be remounted in the primary drive shaft 12 and the coping bit 10 can then be used to form the shorter length tenons 40 without any readjustment of the spacers 36 or ball bearing member 34 mounted on the secondary drive shaft 20. When using the coping bit 10 in its modified form with the subunit 21 removed, two cuts are made in a workpiece 42 to form an extended tenon 48. However, these two cuts are only made for the extended tenons 48, thus minimizing the risk of alignment problems caused by using two separate cutting operations, i.e., because the length of the cuts being made to form only the extended tenons 48 are relatively short, the risk of the extended tenons 48 failing to line up or fit into the recesses 140 being cut in the mating workpieces 42 is significantly reduced. For shorter length tenons 40 and recesses 140, the coping bit 10 in its non-modified configuration with the subunit 21 mounted to the primary drive shaft and the molding bit 110 may be used to form the profiles with one cutting operation.

The coping bit 10 of the present invention used in conjunction with a conventional molding bit 110 provide a single rotating bit pair that is capable of forming properly aligned conventional recesses 140, shorter tenons 40 and extended tenons 48.

The advantages of the present invention as compared with known cutting tools can best be appreciated with reference to a panel door as illustrated in FIG. 8. Heretofore, the craftsman forming the tenons that are needed to join the several parts of the door had the choice of two types of cutting tools. One type utilized two cutting elements spaced apart in fixed relation to one another. These cutters could be used to cut the tenons in the ends of the rails and intermediate styles. Because the spaced cutters are maintained at a set spacing, it is possible to use this tool to make one cut along the rail edges and style edges using one pass of the cutting tool, so that there is no problem of alignment. However, because of the obstruction formed by the shaft, and usually a bearing member, between the spaced cutters, the length of the tenons formed with this type of tool are very limited in terms of length. Accordingly, as discussed above, doors made with these short tenons on the support rails tend to sag because of the small area of contact between the tenons at the ends of the support rails and the recesses in the outside styles. Thus, while the tenons can be formed relatively fast and the resulting tenons having a uniform thickness, the resulting door may sag and be of poor quality because of the relatively short length of the tenons.

Alternatively, the craftsman could use a cutting tool have a single cutting member that has a flat and generally unobstructed top surface. To cut the tenons in the edges of the rails and the intermediate style (see FIG. 8), the craftsman could make a long tenon because there is no obstruction at the top flat surface of the cutting member, and therefore the cutting element could penetrate the side edges of the rails and intermediate style to any desired depth and form relatively long tenons. However, since this type of cutting tool has only one cutting member, the craftsman is required to make two separate passes for each tenon that is cut, one on each side of the tenon to be formed. Thus, looking at FIG. 8, in order to form tenons on one end of the rails and the intermediate style, the craftsman would make a first pass along the top surface of one end of the six rails and the intermediate style to cut away the wood at the top portion of the tenon to be formed. Then, the craftsman, using the same tool, would have to make a second pass along the bottom surface of the same ends of the six rails and the intermediate style, to thereby form the tenons. The craftsman would then have to perform the same cutting operations in order to form tenons on the opposite ends of the six rails and the intermediate style. For a six-panel door, the number of tenons to be formed is fourteen. As the number of panels in the door increases, the number of tenons to be cut drastically increases. Therefore, it will be quickly apparent, looking at FIG. 8, that if the tenons are to have the required uniform thicknesses that will provide a good fit in the recesses formed in the styles, the craftsman, in making the second cut, must move the cutting tool along a path that is exactly aligned with and spaced from the path followed during the first pass. When it is recognized that these two passes are made separately for all of the tenons to be cut, the difficulty of maintaining the required alignment for all of the tenons during the second pass will be self evident. Accordingly, using a cutting tool having only one cutter permits the craftsman to form longer tenons that have sufficient length to provide structural integrity of the door, but the cutting operation itself is tedious and difficult to carry out without some resulting misalignment of the two cut surfaces that, in turn, results in tenons having varying thicknesses along their extending length that weakens the joint between the tenons and the recesses in the styles.

By contrast, the unique programmable coping tool of the present invention provides one tool can be used to form both the extended lengths on the tenons at the ends of the top and bottom rails, and also can be quickly and easily modified to form the short tenons along the ends of intermediate rails and intermediate style using one pass with two fixed cutters that eliminate any problem with alignment. It will be noted that when the longer tenons are cut in the ends of the top and bottom rails, the coping tool of the present invention is used in its single cutting element configuration, and while it is necessary to make two passes along the top and bottom surfaces of the ends of the rails, these passes are very short in length since they need only be made along the length of the end faces of the support rails.

Based on the foregoing, it will be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise to exclude any such other embodiments, adaptations, variations, modifications and equivalent arrangements.

What is claimed is:

1. A coping bit for cutting a profile having an extended tenon in a workpiece, including:
   (a) an axially extending primary drive shaft;
   (b) a first cutting member fixed on the primary drive shaft;
   (c) an axially extending secondary drive shaft having an upper and a lower portion, with the lower portion removably mounted on the primary drive shaft for rotation therewith and with the upper portion extending axially away from the first cutting member on the primary drive shaft; and
   (d) a second cutting member mounted on the secondary drive shaft in spaced relation to the first cutting member when the secondary drive shaft is mounted to the primary drive shaft.

2. The coping bit of claim 1, wherein the first cutting member has a flat planar surface perpendicular to the axis of the primary drive shaft.

3. The coping bit of claim 2, wherein the entire central area of the planar surface of the first cutting member is free from obstruction when the secondary drive shaft is removed from the primary drive shaft.

4. The coping bit of claim 2, wherein a plurality of cutting blades are disposed at the periphery of and are raised above the planar surface.

5. The coping bit of claim 1, further including:
   (a) spacer elements removably mounted on the secondary drive shaft;
   (b) a bearing member removably mounted on the secondary drive shaft intermediate the first and second cutting members; and
   (c) a cap member removably mounted on the secondary drive shaft for maintaining the spacer elements and the bearing member in place on the secondary drive shaft.

6. The coping bit of claim 5, wherein the spacer elements, bearing member and cap member are mounted on the secondary drive shaft in a predetermined spaced relation with one another.

7. The coping bit of claim 5, wherein the spacer elements, bearing member and cap member are mounted on the secondary drive shaft as an integrated subunit that can be removed from and mounted on the primary drive shaft without affecting the predetermined spacing between the spacer elements, the bearing member and the cap member.

8. A coping bit for cutting a profile having an extended tenon in a workpiece, including:
   (a) an axially extending primary drive shaft;
   (b) a first cutting member fixed on the primary drive shaft, said first cutting member having a flat planar surface perpendicular to the axis of the primary drive shaft;
   (c) an axially extending secondary drive shaft having an upper and a lower portion, with the lower portion removably mounted on the primary drive shaft at the central flat planar surface thereof for rotation therewith and with the upper portion extending axially away from the first cutting member on the primary drive shaft; and
   (d) the secondary drive shaft being positioned so that it is the only obstruction on the central area of the flat planar surface of the primary drive shaft when it is mounted thereon whereby when the secondary drive shaft is removed from the primary drive shaft, the entire central area of the planar surface of the first cutting member is entirely free from obstruction.

9. A coping bit for cutting a profile having an extended tenon in workpiece, including:
   (a) an axially extending primary drive shaft having a first cutting member fixed thereon;
   (b) an integral subunit that includes:
      (i) an axially extending secondary drive shaft having an upper and a lower portion, with the lower portion removably mounted on the primary drive shaft for rotation therewith and with the upper portion extending axially away from the first cutting member on the primary drive shaft;
      (ii) a second cutting member mounted on the secondary drive shaft in spaced relation to the first cutting member when the second drive shaft is mounted to the primary drive shaft;
      (iii) spacer elements removably mounted on the secondary drive shaft;
      (iv) a bearing member removably mounted on the secondary drive shaft intermediate the first and second cutting members; and (v) a cap member removably mounted on the secondary drive shaft for maintaining the spacer elements and the bearing member in place on the secondary drive shaft; and (c) a plurality of cutting blades disposed at the periphery of the first and second cutting members.

10. A method for cutting profiles having multiple length tenons in workpieces, including:
   (a) providing a coping bit having an axially extending primary drive shaft with a first cutting member fixed thereon and onto which an axially extending secondary drive shaft having a secondary cutting member fixed thereon is removably mounted for rotation therewith;
   (b) cutting a profile that includes a tenon in a first workpiece utilizing the coping bit in a configuration in which the secondary drive shaft is mounted on the primary shaft;
   (c) modifying the coping bit by removing the secondary drive shaft from the primary drive shaft; and
   (d) cutting a profile having an extended tenon in a second workpiece utilizing the modified coping bit.

11. The method of claim 10, wherein the first workpiece is an intermediate rail for a panel door.

12. The method of claim 10, wherein the second workpiece is a support rail for a panel door.

13. The method of claim 10, wherein the step of providing a coping bit further includes:
   (a) mounting the second cutting member on the secondary drive shaft in spaced relation to the first cutting member when the second drive shaft is mounted to the primary drive shaft, and
   (b) removably mounting the lower portion of the secondary drive shaft on the primary drive shaft so that the upper portion of the secondary drive shaft extends axially away from the first cutting member on the primary drive shaft.

14. The method of claim 13, wherein:
   (a) spacer elements are removably mounted on the secondary drive shaft;
   (b) a bearing member is removably mounted on the secondary drive shaft intermediate the first and second cutting members; and
   (c) a cap member is removably mounted on the secondary drive shaft.

15. The method of claim 14, which includes mounting the spacer elements, bearing member and cap member are mounted on the secondary drive shaft in a predetermined spaced relation with one another.

16. The method of claim 15, which includes precisely maintaining the predetermined spaced relation between the spacer elements, bearing member and cap member on the secondary drive shaft when modifying the coping bit.

17. A method for constructing a panel door, including:
   (a) providing a first and a second style, each having an inside edge;
   (b) providing a first and a second support rail and an intermediate rail, each having a top edge, bottom edge, a left end and a right end;
   (c) providing a plurality of panels;
   (d) providing a coping bit having a cutter member mounted on an axially extending primary drive shaft and an axially extending secondary drive shaft having a cutter member and being removably mounted on the primary drive shaft for rotation therewith;
   (e) providing a molding bit having a cutter member;
   (f) cutting a recess along the inside edges of the first and second styles, the bottom edge of the first support rail, the top edge of the second support rail, and the top and bottom edges of the intermediate rail utilizing the molding bit;
   (g) cutting a profile that includes a tenon in the right end and left end of the intermediate rail utilizing the coping bit in a configuration in which the secondary drive shaft is mounted on the primary shaft;
   (h) modifying the coping bit by removing the secondary drive shaft from the primary drive shaft;
   (i) cutting a profile having an extended tenon in the left end and right end of the first and second support rails utilizing the modified coping bit; and
   (j) assembling the first and second support styles, the first and second support rails, the intermediate rail and the panels to create a panel door by inserting the panels, the tenons of the intermediate rails and the extended tenons of the first and second support rails into the mating recesses of the styles and inserting the panels into the mating recesses of the intermediate rails and the first and second support rails.

* * * * *